Feb. 14, 1950 — B. BORLAND — 2,497,434
CAR SEAL
Filed Oct. 11, 1947
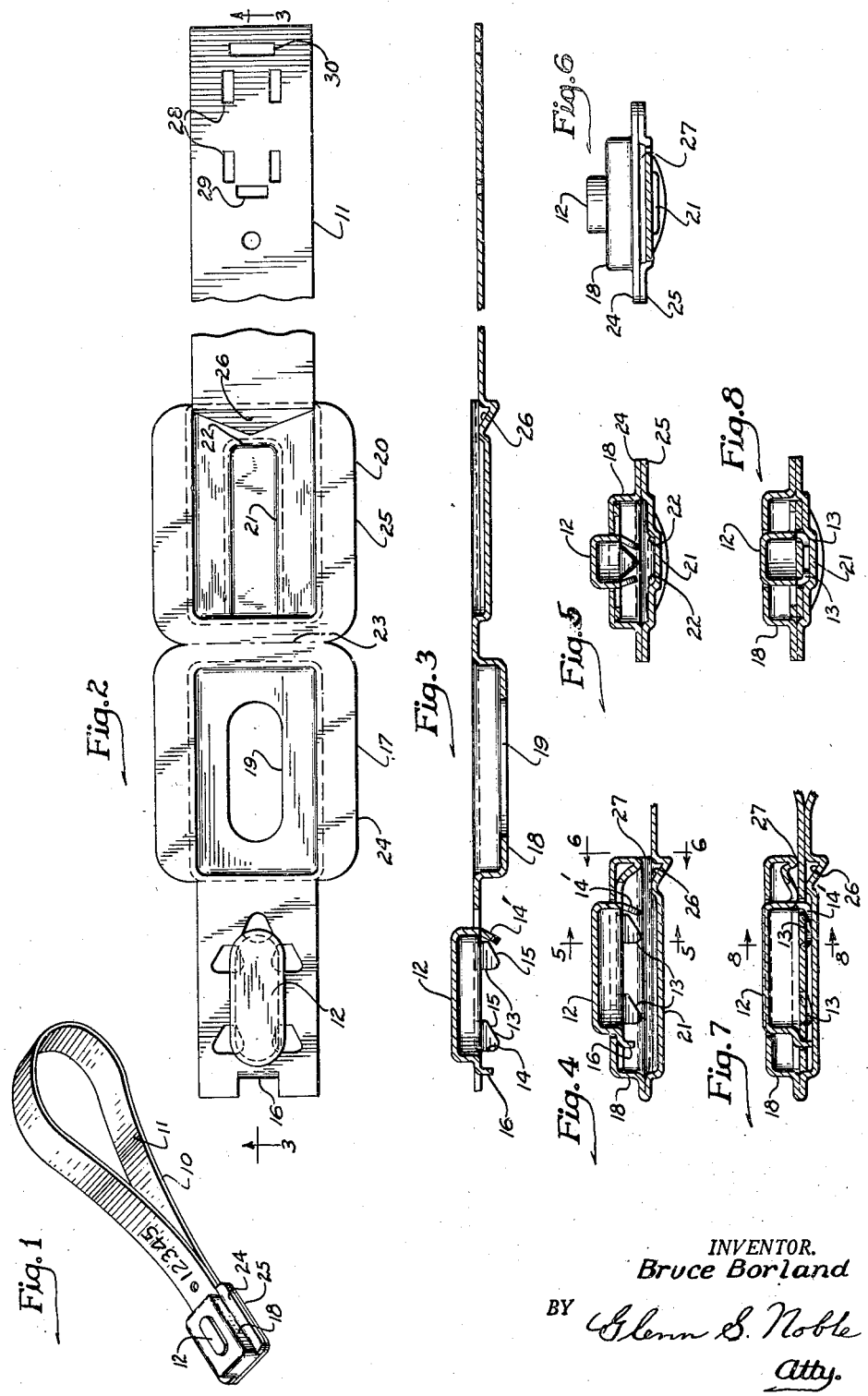
INVENTOR.
Bruce Borland
BY Glenn S. Noble
Atty.

Patented Feb. 14, 1950

2,497,434

UNITED STATES PATENT OFFICE 2,497,434

CAR SEAL

Bruce Borland, Chicago, Ill.

Application October 11, 1947, Serial No. 779,353

5 Claims. (Cl. 292—317)

This invention relates to seals which are adapted for various sealing or protective purposes, but which are especially used for sealing cars. Heretofore various devices of this kind have been used, some being closed by means of a sealing press and others being fastened by resilient fastening tongues or members. In accordance with the present invention, I provide a seal having integrally formed fastening prongs or tongues which are preferably clinched or crimped into positive sealing engagement by means of hand pressure, thus avoiding the necessity of using a sealing press and also insuring a more positive fastening or seal.

The objects of this invention are to provide an improved seal made of a single strip of metal which may be manufactured at low cost and which will be particularly easy to fasten and efficient in operation; to provide a seal having a movable button or part with locking prongs which may be bent to fastening position by hand pressure; and to provide such other novel features and advantages as will appear from the following description taken in connection with the accompanying drawings in which, Fig. 1 is a perspective view showing the seal in locked or fastened position;

Fig. 2 is an enlarged view of the blank used for making the seal;

Fig. 3 is a longitudinal sectional view taken substantially on the line 3—3 of Fig. 1;

Fig. 4 is a sectional view showing the fastening parts in normal position;

Fig. 5 is a sectional view taken on the line 5—5 of Fig. 4;

Fig. 6 is a sectional view taken on the line 6—6 of Fig. 4;

Fig. 7 is a view similar to Fig. 4 for showing the fastening means in closed or fastening position; and Fig. 8 is a sectional view taken on the line 8—8 of Fig. 7.

The seal 10 as shown in Fig. 1 is made of a single strip 11 of tin or sheet metal of the kind commonly used for such purposes. An elongated button 12 is punched or formed up in one end of the strip and has a plurality of bendable tongues or prongs 13 and 14' which extend inwardly around the edges thereof. These prongs are preferably formed integrally with the button and the side prongs have front edges 14 which are at right angles to the strip and beveled ends 15. Another prong 16 is bent downwardly at the end of the strip adjacent to the button 12. Adjacent to this end, the strip has an enlarged portion 17 with a cup or depression 18 having a hole 19 for receiving the button 12 when these parts are folded together as shown in Fig. 4. When the portion containing the button is folded inwardly, it will be noted that it will fit freely within the cup 18 and with the button extending outwardly through the hole 19.

The strip has another enlarged portion 20 adjacent to the enlarged portion 17 which has a depressed elongated central portion 21 having sloping sides 22 which are adapted to coact with the locking tongues or prongs when the seal is to be fastened. The parts 17 and 20 are folded together along the transverse line 23 so that their outwardly extending edges or flanges 24 and 25 will be pressed together and are secured in this position by welding or the like.

The locking section 20 also has a tapered or beveled wall 26 adjacent to the end for guiding the outer end of the seal into its locking chamber through the opening 27.

The outer or free end of the strip 11 is provided with holes 28 which are adapted to be engaged by the prongs 13 and also with a transverse hole 29 which is adapted to be engaged by the prong 14', and a transverse hole 30 which is adapted to be engaged by the tongue 16.

When the end portions of the seal which have just been described have been folded together as shown and secured by welding or otherwise, they form a locking head for receiving the free end of the strip. When this end is inserted in the locking head as shown in Figs. 7 and 8, the holes 28, 29 and 30 will be in position to receive the corresponding tongues or prongs which extend inwardly from the button. The seal is then closed or fastened by pressing in on the button which causes the tongues 13 and 14' to enter the respective holes and their ends will engage with the inner surface of the depressed portion 21 which acts as an anvil to bend the ends inwardly and clinch or crimp them into locking position as shown in Figs. 7 and 8.

It will also be noted that the projection 16 will enter the slot or hole 30 and further serve in securing the end portion of the strip in locking or sealed position. This sealing operation may be quickly and easily done and a substantially permanent seal is provided which must be broken in order to remove the same from the car and after being broken cannot readily be arranged to prevent disclosure of such breakage particularly if any unwarranted tampering was attempted.

Having thus described my invention, what I claim is:

1. A car seal consisting of a sealing strip having holes adjacent to the free end, a casing at the opposite end, a button movably mounted in the casing and normally held in extended position, bendable prongs extending inwardly from the button and adapted to engage said holes when the free end is inserted in the casing, the arrangement being such that the button may be pressed inwardly to clinch the prongs against the opposite side of the casing to fasten the free end in locking position and to hold the button in depressed position.

2. A blank for forming a car seal, consisting of a strip of tin, having an end section provided with a raised button-like projection with flexible prongs extending on the opposite side of the projection, a second section adjacent to the first named section having a depressed portion for receiving the first named section and having an opening adapted to receive the button-like projection, and a third section having a depressed portion adapted to serve as an anvil for clinching the prongs, and a strip extending from the last named section provided with holes adjacent to the end thereof adapted to receive the prongs when the seal is to be locked.

3. A car seal formed of a single strip with a button punched therein adjacent to one end thereof and having integrally formed tongues extending from the button on the opposite side of the strip, a widened portion adjacent to the button portion having a cup extending on the side opposite from the button and provided with a hole for receiving the button when it is folded over into the cup section and a second enlarged portion having a longitudinal depression with sloping sides, said enlarged portions being folded together and welded or otherwise secured to form a casing with an opening for receiving the free end of the strip which extends outwardly from the last named section, the free end having holes which are adapted to register with the tongues when it is inserted in the casing, the arrangement being such that when the button is pressed, the tongues will be forced through the holes and clinched against the surface of the opposite side of the casing.

4. A car seal, comprising a metallic strip having a longitudinally arranged pocket at one end and a manually operable fastening button mounted in said pocket and extending outwardly through an opening therein, integrally formed bendable prongs extending inwardly from the button, the free end of the strip having holes adapted to register with said prongs when inserted in the pocket through an opening in one end thereof, the arrangement being such that when the free end is inserted in the pocket, the button may be depressed to clinch the prongs by bending them against the opposite side of the pocket and fasten the free end securely in the pocket.

5. In a seal, the combination of a metallic band having a locking cap at one end, a manually operable sealing member mounted in the cap and projecting outwardly through a hole therein, said sealing member having a plurality of inwardly extending projections, the free end of the band having a plurality of holes adapted to register with said projections, the arrangement being such that when the manually operable member is depressed, the projections will engage with the holes in the band and some of said projections will be clinched by being bent inwardly against the opposite side of the cap.

BRUCE BORLAND.

REFERENCES CITED

The following references are of record in the file of this patent:

UNITED STATES PATENTS

| Number | Name | Date |
|---|---|---|
| 327,783 | Foote | Oct. 6, 1885 |